Patented Mar. 7, 1950

2,499,627

UNITED STATES PATENT OFFICE 2,499,627

PREPARATION OF 2-MERCAPTO, 5-CHLOROBENZOTHIAZOLE

Lester A. Brooks, Fairfield, Conn., assignor to R. T. Vanderbilt Company, Inc., New York, N. Y., a corporation of New York No Drawing. Application February 28, 1947, Serial No. 731,699

2 Claims. (Cl. 260—306)

My invention relates to improvements in the preparation of 2-mercapto, 5-chloro benzothiazole. This compound may be typified by the following formula:

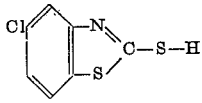

It is useful, for example, as an intermediate in the preparation of a number of other organic compounds. The improvements of my invention afford economies, particularly in time, and make possible the economical production of a product of high purity.

In the conventional preparation of mercapto benzothiazole, ortho chloro nitrobenzene is reacted with hydrogen sulfide and carbon disulfide in an aqueous solution of sodium hydrogen sulfide. The hydrogen sulfide and carbon disulfide are introduced into the aqueous reaction medium as a gas mixture consisting of hydrogen sulfide saturated with respect to carbon disulfide at a temperature of about 20° C. When this method as conventionally practiced is applied to the preparation of 2-mercapto, 5-chloro benzothiazole, by supplying 2,5 dichloronitro-benzene rather than ortho chloro nitrobenzene to the reaction, the reaction proceeds very slowly and an impure product is obtained.

Referring now to the reaction with 2,5 dichloronitrobenzene for the preparation of 2-mercapto, 5-chloro benzothiazole, I have found that the time required can be radically reduced by introducing the hydrogen sulfide and carbon disulfide into the aqueous reaction medium as a gas mixture consisting of hydrogen sulfide saturated with respect to carbon disulfide at a temperature of about 35°–40° C. Again referring to this reaction, I have also found that the ordinary product is apparently contaminated with intermediate reaction products, particularly 2,5 dichloroaniline, but that 2-mercapto, 5-chloro benzothiazole of high purity with respect to such contaminants can be obtained by cooling the aqueous reaction mixture, after completion, to about 15°–25° C. and diluting it with water to precipitate 2,5 dichloroaniline and separating this precipitated material from the solution.

The reaction mixture may either be cooled to about 15°–25° C. and then diluted, or diluted and then cooled, or diluted and cooled simultaneously. If the cooling precedes the dilution, some of the sodium salt of 2-mercapto, 5-chloro benzothiazole may initially precipitate which will then redissolve on dilution.

The following example will illustrate the practice of my invention: The reaction is effected in a 2-liter flask equipped with a reflux condenser and a stirrer associated with an oil bath for heating the flask. A solution of either 130 grams of 60% $Na_2S$ or 240 grams of $Na_2S.9H_2O$ in a liter of water is charged to this flask and heated to about 40°–50° C. Hydrogen sulfide is then introduced into the solution until 34 grams of the gas have been absorbed. The resulting aqueous solution of sodium hydrogen sulfide is then heated to a temperature of about 110° C. and, with the stirrer in operation, 100 grams of 2,5 dichloronitrobenzene is introduced into the reaction medium over a period of two hours while maintaining the temperature of 110° C. and while introducing hydrogen sulfide saturated with respect to carbon disulfide at a temperature of 35°–40° C. The stirring and the introduction of the gas mixture of hydrogen sulfide and carbon disulfide are continued for about one-half hour after the introduction of the 2,5 dichloronitrobenzene is completed. The aggregate quantity of carbon disulfide thus applied to the reaction should somewhat exceed that required to react with the equivalent of the 2,5 dichloronitrobenzene. The resulting solution is dark red. This aqueous solution is cooled to about 15°–25° C. and diluted with about 6 liters of water of the same temperature and allowed to stand for 12 hours. The solution is then filtered and 16 grams of precipitated material, principally 2,5 dichloroaniline, is separated by filtration. The clear yellow-orange solution resulting is neutralized with N/10 sulfuric acid to precipitate a crude 2-mercapto, 5-chloro benzothiazole containing the by-product sulfur. After separation from the solution by filtration, the 2-mercapto, 5-chloro benzothiazole is dissolved in aqueous ammonia leaving the sulfur undissolved and is separated from the sulfur by filtration. Acidification of this filtrate of N/10 sulfuric acid yields a white, bulky, gelatinous precipitate which is separated by filtration and dried, as far as possible, by pressing. The product is then stirred with about ½ liter of benzene until a substantial volume of water separates and the precipitate forms a paste with the benzene. This paste is separated by filtration and dried by evaporation of the benzene to yield 73 grams of a powdery dry product, 2-mercapto, 5-chloro benzothiazole, with a melting point of 201°–202° C.

The first and second acidifications can be performed with hydrochloric acid in place of sulfuric acid.

Stirring during the primary reaction is important. Effective dispersion of the dichloronitrobenzene and of the carbon disulfide in the aqueous reaction mixture promotes a high recovery of 2-mercapto, 5-chloro benzothiazole of high purity.

The gas mixture consisting of hydrogen sulfide saturated with respect to carbon disulfide at a temperature of about 35°–40° C. can be conveniently prepared by bubbling the required hydrogen sulfide through 200–300 cubic centimeters of carbon disulfide in a flask maintained at a temperature of 35°–40° C.

I claim:

1. In the preparation of 2-mercapto, 5-chloro benzothiazole, by reacting 2,5-dichloronitrobenzene with hydrogen sulfide and carbon disulfide in an aqueous solution of sodium hydrogen sulfide, the improvement which comprises introducing the hydrogen sulfide and carbon disulfide into the aqueous reaction medium as a gas mixture consisting of hydrogen sulfide saturated with respect to carbon disulfide at a temperature of 35°–40° C.

2. In the preparation of 2-mercapto, 5-chloro benzothiazole, by reacting 2,5-dichloronitrobenzene with hydrogen sulfide and carbon disulfide in an aqueous solution of sodium hydrogen sulfide, the improvement which comprises introducing the hydrogen sulfide and carbon disulfide into the aqueous reaction medium as a gas mixture consisting of hydrogen sulfide saturated with respect to carbon disulfide at a temperature of 35°–40° C. and cooling the aqueous reaction mixture to 15°–25° C. and diluting it with water to precipitate unconverted 2,5-dichloroaniline and separating the precipitated material from the resulting solution of the sodium salt of 2-mercapto, 5-chloro benzothiazole.

LESTER A. BROOKS.

REFERENCES CITED

The following references are of record in the file of this patent:

UNITED STATES PATENTS

| Number | Name | Date |
|---|---|---|
| 1,669,630 | Sebrell | May 15, 1928 |
| 1,865,477 | Messer | July 5, 1932 |
| 1,876,929 | Herz | Sept. 13, 1932 |

OTHER REFERENCES

J. A. C. S., vol. 49, pages 1748–1758, July 1927.